(12) United States Patent
Vu

(10) Patent No.: US 10,810,150 B1
(45) Date of Patent: Oct. 20, 2020

(54) CONFIGURATION OF A SOLID-STATE DRIVE DOCK HAVING LOCAL AND NETWORK INTERFACES

(71) Applicant: American Megatrends International, LLC, Norcross, GA (US)

(72) Inventor: Hoang Ngoc Minh Vu, Duluth, GA (US)

(73) Assignee: American Megatrends International, LLC, Norcross, GA (US)

( * ) Notice: Subject to any disclaimer, the term of this patent is extended or adjusted under 35 U.S.C. 154(b) by 0 days.

(21) Appl. No.: 16/442,407

(22) Filed: Jun. 14, 2019

Related U.S. Application Data

(63) Continuation of application No. 15/647,011, filed on Jul. 11, 2017, now Pat. No. 10,346,335.

(51) Int. Cl.
  *G06F 13/38* (2006.01)
  *G06F 13/42* (2006.01)
  *H04L 12/861* (2013.01)
  *G06F 15/78* (2006.01)

(52) U.S. Cl.
  CPC ........ *G06F 13/385* (2013.01); *G06F 13/4282* (2013.01); *G06F 15/7825* (2013.01); *H04L 49/9068* (2013.01)

(58) Field of Classification Search
  CPC combination set(s) only.
  See application file for complete search history.

(56) References Cited

U.S. PATENT DOCUMENTS

| | | | |
|---|---|---|---|
| 9,612,775 B1* | 4/2017 | Post | G06F 3/0679 |
| 9,961,168 B1* | 5/2018 | Malkawi | H04L 69/08 |
| 10,079,889 B1* | 9/2018 | Malwankar | H04L 67/2842 |
| 2006/0161709 A1* | 7/2006 | Davies | G06F 13/404 |
| | | | 710/268 |
| 2010/0332922 A1* | 12/2010 | Chang | G11C 5/143 |
| | | | 714/704 |

(Continued)

OTHER PUBLICATIONS

U.S. Appl. No. 15/647,011, External M.2 Solid-State Drive Dock With Local and Network Interfaces, filed Jul. 11, 2017, first named inventor: Hoang Ngoc Minh Vu.

(Continued)

*Primary Examiner* — Raymond N Phan
(74) *Attorney, Agent, or Firm* — Newport IP, LLC

(57) ABSTRACT

An external M.2 solid-state drive dock with local and network interfaces is disclosed. The dock includes an enclosure with apertures through which M.2 solid-state drives can be received. A circuit board is mounted within the enclosure that includes M.2 socket connectors for receiving the M.2 solid-state drives. The circuit board also includes a storage controller coupled to the M.2. socket connectors. A local interface controller is coupled to the storage controller for providing a local interface, such as a USB-C interface, to the M.2 solid-state drives to host computers. A network controller is also coupled to the storage controller for providing network interfaces, such as wired and/or wireless network interfaces, for accessing the M.2. solid-state drives. The storage controller can receive storage requests from the local interface controller and the network interface controller and provide the storage requests to the M.2 solid-state drives.

8 Claims, 2 Drawing Sheets

(56) References Cited

U.S. PATENT DOCUMENTS

| | | | | |
|---|---|---|---|---|
| 2012/0110262 | A1* | 5/2012 | Zhang | G06F 3/0607 |
| | | | | 711/114 |
| 2015/0277935 | A1* | 10/2015 | Desimone | G06F 13/4282 |
| | | | | 710/313 |
| 2016/0306768 | A1* | 10/2016 | Mataya | G06F 13/4068 |
| 2016/0335220 | A1* | 11/2016 | Breakstone | G06F 13/4282 |
| 2017/0228179 | A1* | 8/2017 | Levinson | G06F 3/0619 |
| 2018/0293407 | A1* | 10/2018 | Wu | H04L 9/3234 |
| 2019/0272245 | A1* | 9/2019 | Olarig | G06F 13/1668 |
| 2019/0303335 | A1* | 10/2019 | Remis | G06F 13/4068 |

OTHER PUBLICATIONS

USPTO Non Final Office Action dated Aug. 28, 2018 in U.S. Appl. No. 15/647,011, External M.2 Solid-State Drive Dock With Local and Network Interfaces, filed Jul. 11, 2017, first named inventor: Hoang Ngoc Minh Vu, 23 pp.

USPTO Notice of Allowance dated Feb. 27, 2019 in U.S. Appl. No. 15/647,011, External M.2 Solid-State Drive Dock With Local and Network Interfaces, filed Jul. 11, 2017, first named inventor: Hoang Ngoc Minh Vu, 5 pp.

M.2 Definition, Wikipedia—The Free Encyclopedia (2017), https://en.wikipedia.org/wiki/M.2, 4 pp.

M.2 SATA External SSD Enclosure—USB 3.0 with UASP, StarTech.com, https://www.startech.com/HDD/Enclosures/m2-ssd-enclosure~SM2NGFFMBU33, 3 pp.

\* cited by examiner

CONFIGURATION OF A SOLID-STATE DRIVE DOCK HAVING LOCAL AND NETWORK INTERFACES

CROSS-REFERENCE TO RELATED APPLICATION

This application is a continuation of U.S. patent application Ser. No. 15/647,011, filed Jul. 11, 2017, the content of which application is hereby expressly incorporated herein by reference in its entirety.

BACKGROUND

M.2 (which was previously referred to as the "Next Generation Form Factor") is a specification for internally mounted computer expansion cards and associated connectors. The M.2 physical specification allows different module widths and lengths and, paired with the availability of more advanced interfacing features, makes M.2 expansion cards particularly suitable for use in small computing devices, such as "ultrabook" or tablet computers.

Because M.2 is a specification for internally mounted computer expansion cards, M.2 compatible expansion cards are typically utilized within computing systems. In order to utilize M.2 expansion cards external to a computing system, external enclosures can be utilized. However, in order to replace an M.2 expansion card in an external enclosure with a different M.2 expansion card, it is typically necessary to: 1) unmount the M.2 expansion card from the host computer; 2) disconnect the cable connecting the external enclosure to the host computer; 3) disassemble the external enclosure; 4) remove the M.2. expansion card from the external enclosure; 5) insert a different M.2 expansion card; 6) reassemble the external enclosure; and 7) re-connect the cable between the external enclosure and the host computer.

In addition to being extremely inconvenient to a user, the process described above can increase the likelihood of damaging M.2 expansion cards, particularly the likelihood of data loss with M.2 solid-state drives ("SSDs"). It is with respect to these and other considerations that the disclosure made herein is presented.

SUMMARY

In order to address the considerations set forth above, and potentially others, an external M.2 solid-state drive dock with local and network interfaces (which might be referred to herein as "the dock") is disclosed herein. The dock includes an enclosure with apertures through which M.2 solid-state drives can be received. A circuit board is mounted within the enclosure that includes M.2 socket connectors for receiving the M.2 solid-state drives through the apertures.

The circuit board also includes a storage controller coupled to the M.2. socket connectors. A local interface controller is coupled to the storage controller for providing a local interface, such as a USB-C interface, to the M.2 solid-state drives to host computers. A network controller is also coupled to the storage controller for providing network interfaces, such as wired and/or wireless network interfaces, for accessing the M.2. solid-state drives.

The storage controller can receive storage requests from the local interface controller and the network interface controller and provide the storage requests to the M.2 solid-state drives. The M.2 solid-state drives can be hot swapped into and out of the dock, thereby enabling more convenient use of M.2 solid-state drives external to a host computer. The disclosed dock can also reduce the risk of data loss or other types of damage to M.2 solid-state drives as compared to previous solutions that utilize external enclosures.

It is to be appreciated that technical benefits other than those specifically mentioned herein can be realized through an implementation of the disclosed technologies. It is to be further appreciated that various aspects of the subject matter disclosed herein can be implemented as an apparatus, a computer-implemented method, a computing system, or as an article of manufacture such as a non-transitory computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
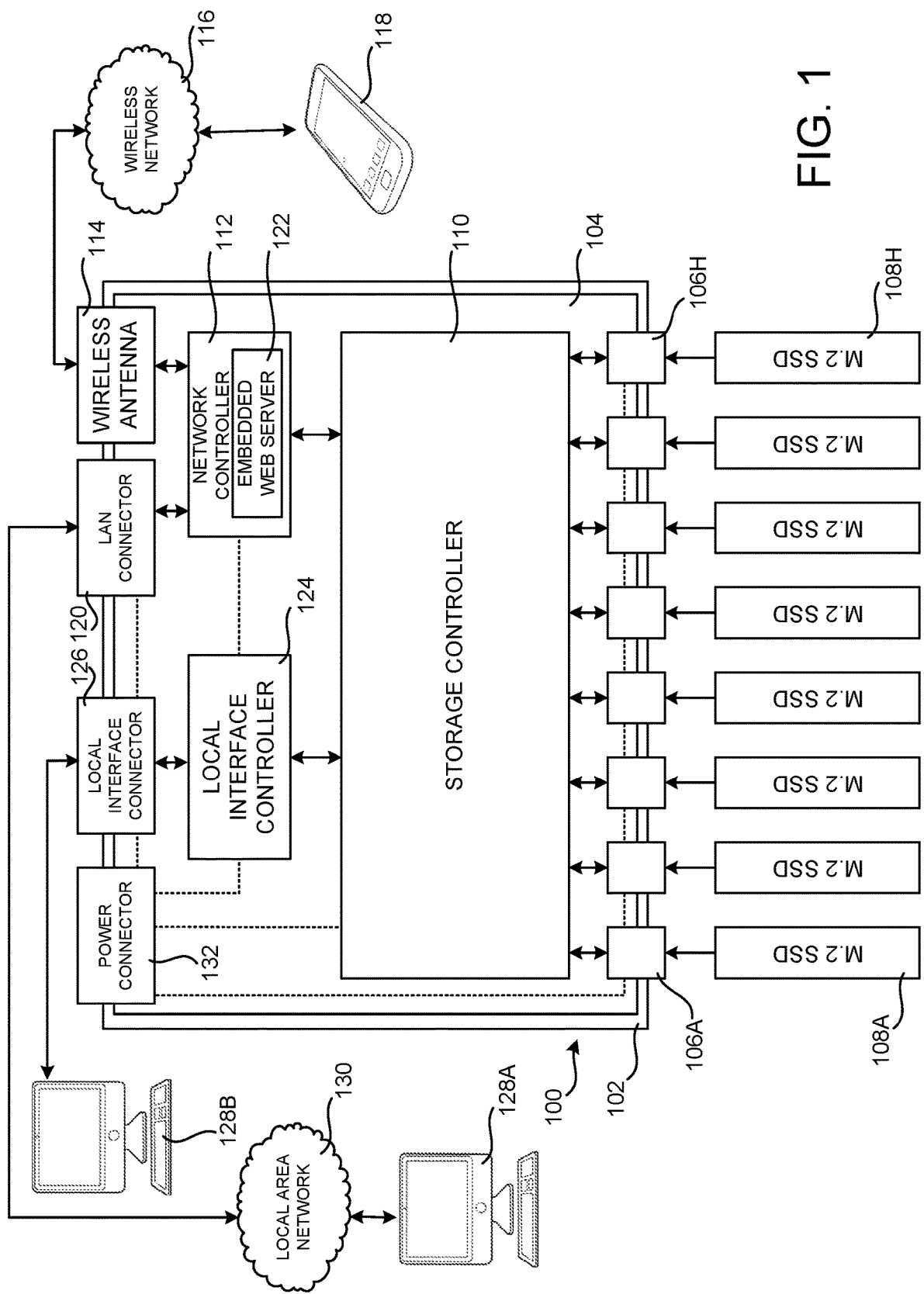
FIG. 1 is computer architecture diagram showing one illustrative configuration for an external M.2 solid-state drive dock with local and network interfaces, according to one configuration disclosed herein.

The following detailed description is directed to an external M.2 solid-state drive dock with local and network interfaces. In the following detailed description, references are made to the accompanying drawings that form a part hereof, and which are shown by way of illustration specific embodiments or examples. Referring now to the drawings, in which like numerals represent like elements through the several FIGS., aspects of an external M.2 solid-state drive dock with local and network interfaces will be described.

FIG. 1 is computer architecture diagram showing one illustrative configuration for an external M.2 solid-state drive dock 100 with local and network interfaces, according to one configuration disclosed herein. The dock 100 shown in FIG. 1 can include an enclosure 102, which is made from a suitable material, such as plastic or metal. The enclosure 102 houses a printed circuit board 104, on which a multitude of components or devices can be connected by way of a system bus or other electrical communication path. Some of these components are described in detail below.

In particular, the circuit board 104 includes multiple M.2 socket connectors 106A-106H that are configured to receive M.2 solid-state drives 108A-108H through apertures in the enclosure 102. When inserted into an M.2 socket connector 106, an M.2 SSD 108 is accessible from the outside of the enclosure 102. In this manner, a user of the dock 100 can insert and remove M.2 SSDs 108 from the dock 100 as desired. Eight M.2 socket connectors 106A-106H are illustrated in FIG. 1. More or fewer M.2 socket connectors 106 can be utilized in other configurations. However, in all configurations at least two M.2 socket connectors 106 are present on the circuit board 104.

As discussed briefly above, M.2 (which was previously referred to as the "Next Generation Form Factor") is a specification for internally mounted computer expansion cards and associated connectors. The M.2 physical specification allows different module widths and lengths and, paired with the availability of more advanced interfacing features, makes M.2 expansion cards particularly suitable for use in small computing devices, such as "ultrabook" or tablet computers. Additional details regarding the M.2 specification can be found in the "PCI Express M.2 Specification Revision 1.1", which is available from the Peripheral Component Interconnect Special Interest Group ("PCI-SIG"), and which is expressly incorporated herein by reference in its entirety.

The circuit board 104 also includes a storage controller 110 that is electrically coupled to the M.2 socket connectors 106 by way of a bus, such as a Peripheral Component Interconnect ("PCI") Express bus. As will be described in greater detail below, the storage controller 110 provides functionality for routing storage requests (e.g. read and write requests) received from host computers connected to the dock 100 to and from the M.2 SSDs 108.

In the example configuration shown in FIG. 1, the storage controller 110 is also electrically connected to a local interface controller 124. In turn, the local interface controller 124 is electrically connected to a local interface connector 126, which provides a physical connection between the dock 100 and a host computer 128B that is local to the dock 100 (i.e. in the same physical location). In one particular configuration, the local interface controller 124 is a Universal Serial Bus ("USB") interface controller and the local interface connector 126 is a USB port such as, but not limited to, a USB 2.0 port, a USB 3.0 port, a USB 3.1 port, or a USB-C port. The local interface controller 124 can support other types of local interfaces in other configurations, such as a THUNDERBOLT or FIREWIRE interface. The storage controller 110, local interface controller 124, and local interface connector 126 allow for the connection of a local host computer 128B to the dock 100, and for enabling the host computer 128B to issue storage requests to the M.2 SSDs 108 through the local connection. Additional details regarding this process will be provided below.

The dock 100 can also include a network controller 112 that is electrically connected to the storage controller 110. In turn, the network controller 112 can be connected to a wired network connector, such as the local area network ("LAN") connector 120 illustrated in FIG. 1. The LAN connector 120 provides functionality for providing a physical network connection between the dock 100 and a host computer 128A on a LAN 130. The storage controller 110, network controller 112, and LAN connector 120 allow for the connection of a host computer 128A to the dock 100 by way of a wired LAN 130, and for enabling the host computer 128A to issue storage requests to the M.2 SSDs 108 through the LAN 130. Additional details regarding this process will be provided below.

In the configuration shown in FIG. 1, the network controller 112 also provides functionality for connecting the dock 100 to a wireless network 116. In particular, the network controller 112 can include a suitable wireless radio (not shown in FIG. 1) and a wireless antenna 114 for communicating over a wireless network 116, such as a WI-FI network. The storage controller 110, network controller 112, and wireless antenna 114 allow for the connection of a wireless computing device 118, such as a tablet or smartphone, to the dock 100 by way of a wireless network 116, and for enabling the wireless computing device 118 to issue storage requests to the M.2 SSDs 108 via the wireless network 116. Additional details regarding this process will be provided below.

As shown in FIG. 1, the circuit board 104 can also include a power connector 132 for connecting the circuit board 104 to an external power supply (not shown in FIG. 1). The power connector 132 is electrically connected to the M.2 socket connectors 106 in order to provide power to the M.2 SSDs 108. The power connector 132 is also connected to the storage controller 110, the local interface controller, local interface connector 126, the network controller 112, and the LAN connector 120 in order to provide power to these components. An internal power supply can be utilized to provide electrical power to these components in other configurations.

In some configurations, the circuit board 104 also includes light emitting diodes ("LEDs") (not shown in FIG. 1) that are mounted adjacent to the M.2 socket connectors 106. In this configuration, the storage controller 110 can illuminate an LED when a corresponding M.2 SSD 108 is accessed. The storage controller 110 can also illuminate an LED to indicate other types of activity for a corresponding M.2 SSD 108. For example, and without limitation, an LED can be illuminated when a corresponding M.2 SSD 108 is full, when it is safe to remove a corresponding M.2 SSD 108 from the dock 100, when a corresponding M.2. SSD 108 has failed, and/or other conditions. Different color LEDs and/or blinking patterns can also be utilized to uniquely identify the various conditions described above.

The circuit board 104 also includes buttons mounted adjacent to the M.2 socket connectors 106 in some configurations. The buttons can be pressed to indicate that an M.2 SSD 108 is to be hot swapped. When a corresponding M.2 SSD 108 can safely be removed from the dock 100, one of the LEDs described above can be illuminated. As known in the art, hot swapping refers to a process for inserting and removing components without powering down a device, in this case the dock 100.

In some configurations, the network controller 112 includes an embedded web server 122. The embedded web server 122 can provide a web site through which a user of the dock 100 can manage the operation of the dock 100 over a wireless network 116 or a wired network, such as the LAN 130. For example, and without limitation, a user of the wireless computing device 118 can utilize a suitable application (e.g. a web browser or custom application) to access the web site provided by the embedded web server 122 over the wireless network 116.

The web site can provide functionality for allowing the user to set various configuration options for the dock 100, to select the M.2. SSDs 108 that are to be made available through the LAN 130 and the wireless network 116, and/or to specify other options regarding the operation of the dock 100. Data identifying the user-specified options can be stored in a non-volatile memory (not shown in FIG. 1), also on the circuit board 104.

Figure 2:
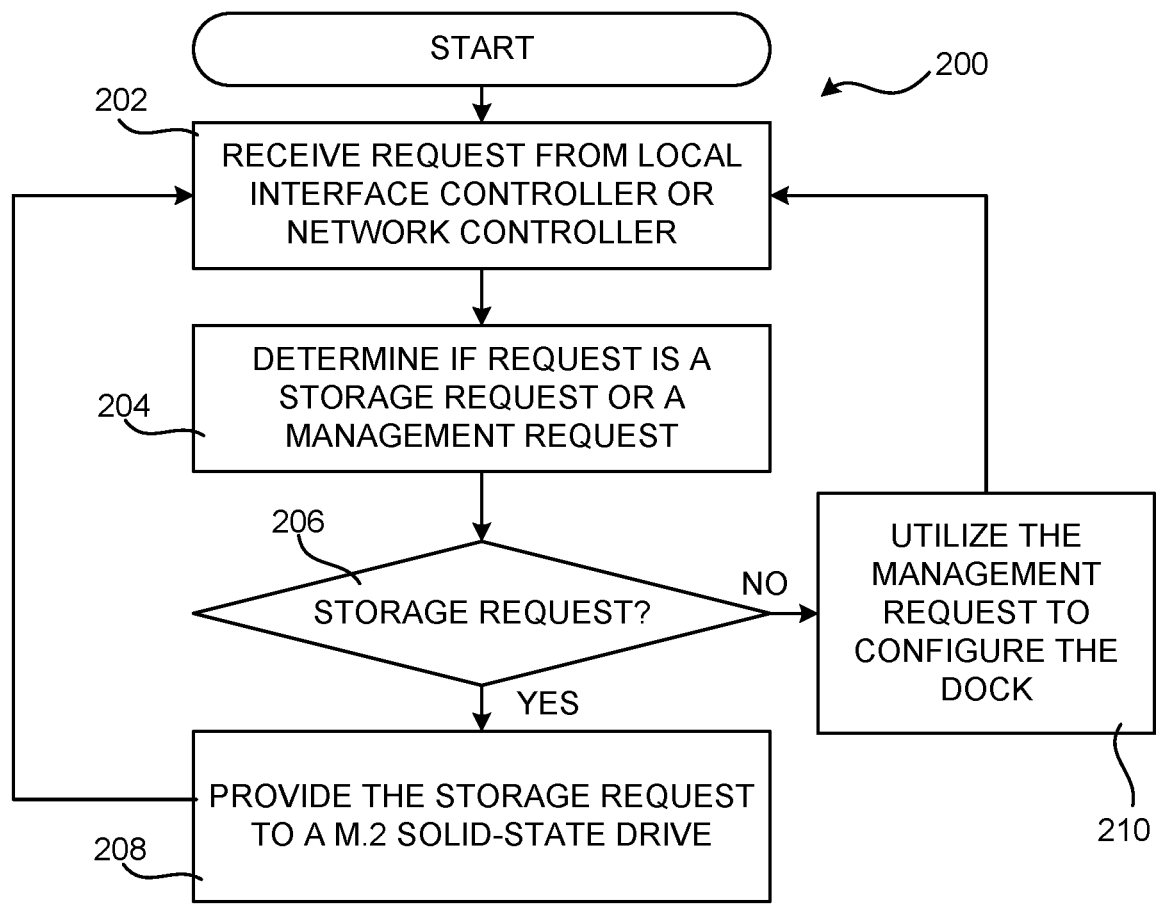
FIG. 2 is a flow diagram illustrating aspects of one method disclosed herein for processing requests received at an external M.2 solid-state drive dock with local and network interfaces, according to one configuration disclosed herein.

FIG. 2 is a flow diagram illustrating aspects of one routine 200 disclosed herein for processing requests received at the dock 100 shown in FIG. 1 and described above, according to one configuration disclosed herein. It should be appreciated that the logical operations described herein with regard to FIG. 2 and the other FIGS. are implemented (1) as a sequence of computer implemented acts or program modules running on a computing system and/or (2) as interconnected machine logic circuits or circuit modules within a controller, such as the local interface controller 124, the network controller 112, or the storage controller 110. The implementation is a matter of choice dependent on the performance requirements of the computing system. Accordingly, the logical operations described herein are referred to variously as operations, structural devices, acts, or modules. These operations, structural devices, acts and modules can be implemented in software, in firmware, in special purpose digital logic, in the storage controller 110, and any combination thereof.

The routine 200 begins at operation 202, where the local interface controller 124 or the network controller 112 receives a request from a host computer. As discussed above, such a request can be initiated by a host computer 128A connected to the dock 100 by way of the LAN 130, by a host computer 128B connected to the dock 100 by way of a local interface, such as USB or THUNDERBOLT, or a wireless computing device 118 connected to the dock by way of a wireless network 116.

From operation 202, the routine 200 proceeds to operation 204, where the local interface controller 124 or the network controller 112 determines whether the request received at operation 202 is a storage request or a management request. A storage request is a request to read from or write to a M.2 SSD 108. A management request is a request to configure aspects of the operation of the dock 100.

If the request received at operation 202 is a storage request, the routine 200 proceeds from operation 206 to operation 208. At operation 208, the storage request is passed to the storage controller 110 which, in turn, passes the storage request to one of the M.2. SSDs 108. A response to the request can be passed from the M.2 SSD 108 to the storage controller 110 and, subsequently, to either the local interface controller 124 or the network controller 112 for delivery to the host computer that issued the request. From operation 208, the routine 200 proceeds back to operation 202, where the process described above can be repeated.

If the request received at operation 202 is a management request, the routine 200 proceeds from operation 206 to operation 210. At operation 210, the local interface controller 124 or the network controller 112 updates the configuration of the dock 100 based upon the received management request. As discussed above, a management request can specify various configuration options for the dock 100 such as, but not limited to, selecting the M.2. SSDs 108 that are to be made available through the LAN 130 and the wireless network 116 and/or to specify other options regarding the operation of the dock 100. Data identifying the configuration of the dock 100 can be stored in a non-volatile memory on the circuit board 104. From operation 210, the routine 200 proceeds back to operation 202, where the process described above can be repeated.

Based on the foregoing, it should be appreciated that an external M.2 solid-state drive dock with local and network interfaces has been disclosed herein. The subject matter described above is provided by way of illustration only and should not be construed as limiting. Various modifications and changes can be made to the subject matter described herein without following the example configurations illustrated and described, and without departing from the true spirit and scope of the present invention, which is set forth in the following claims.

What is claimed is:

1. A method, comprising:
   receiving, by a controller device, a request message from a computing device connected to a solid-state drive dock, wherein the controller device is assembled in the solid-state drive dock and comprises one of a local interface controller device or a network controller device;
   determining that the request message defines a management request to configure an element of operation of the solid-state drive dock; and
   configuring the solid-state drive dock according to the management request.

2. The method of claim 1, wherein the configuring comprises selecting an M.2 solid-state drive to be available by means of a local area network coupled to the solid-state drive dock.

3. The method of claim 1, wherein the local interface controller device is configured to provide a local connection to the computing device, and wherein the local interface controller device comprises a Universal Serial Bus (USB) controller.

4. The method of claim 1, wherein the network controller device is configured to connect to a wireless network for communication with the computing device, and wherein the network controller comprises one or more components for communicating over the wireless network.

5. The method of claim 1, further comprising,
   receiving, by the controller device, a second request message from the computing device;
   determining that the second request message defines a storage request to read from or write to an M.2 solid-state drive functionally coupled to the solid-state drive dock by means of an M.2 socket connector; and
   providing the storage request to the M.2 solid-state drive.

6. The method of claim 4, wherein the network controller device further comprises an embedded web server for providing a web site for managing the operation of the solid-state drive dock.

7. The method of claim 5, wherein the providing the storage request comprises,
   sending, by the controller device, the storage request to a storage controller device assembled in the solid-state drive dock, wherein the storage controller device is coupled to the local interface controller device and the network controller device;
   sending, by the storage controller device, the storage request to the M.2 solid-state drive.

8. The method of claim 7, wherein the solid-state drive dock comprises,
   an enclosure having a plurality of apertures therein;
   a circuit board mounted within the enclosure, the circuit board comprising,
      a plurality of M.2 socket connectors configured to receive a like plurality of M.2 solid-state drives through the plurality of apertures, wherein the storage controller device is coupled to the plurality of M.2 socket connectors;
      a local interface connector coupled to the local interface controller device for providing a connection to one or more second computing devices; and
      a power connector for receiving power from a power supply external to the enclosure, the power connector electrically connected to the plurality of M.2 socket connectors, the storage controller device, the local interface controller device, and the network controller device.

* * * * *

UNITED STATES PATENT AND TRADEMARK OFFICE
CERTIFICATE OF CORRECTION

Page 1 of 1

PATENT NO. : 10,810,150 B1
APPLICATION NO. : 16/442407
DATED : October 20, 2020
INVENTOR(S) : Hoang Ngoc Minh Vu It is certified that error appears in the above-identified patent and that said Letters Patent is hereby corrected as shown below:

In the Claims

In Claim 7, Line 38, delete "claim 5" and insert -- claim 6 --.

Signed and Sealed this
Twenty-second Day of December, 2020

Andrei Iancu
*Director of the United States Patent and Trademark Office*